April 16, 1929.　　I. J. REMARK　　1,709,810
COLLAPSIBLE CORE
Filed June 9, 1923　　2 Sheets-Sheet 1

Inventor
ISIDORE J. REMARK.
Attorney

April 16, 1929.  I. J. REMARK  1,709,810
COLLAPSIBLE CORE
Filed June 9, 1923   2 Sheets-Sheet 2

Inventor
ISIDORE J. REMARK.
By
Attorney

Patented Apr. 16, 1929.

1,709,810

UNITED STATES PATENT OFFICE.

ISIDORE J. REMARK, OF AKRON, OHIO, ASSIGNOR TO THE GENERAL TIRE AND RUBBER COMPANY, OF AKRON, OHIO, A CORPORATION OF OHIO.

COLLAPSIBLE CORE.

Application filed June 9, 1923. Serial No. 644,335.

This invention relates to collapsible cores, such as used in the manufacture of pneumatic tires, and particularly to that type of collapsible core in which all of the sections are permanently connected to a collapsing mechanism by which they may be withdrawn from the tire after the building operation is completed and then restored to circular or operative condition.

The type of core to which this invention particularly relates is formed from a plurality of sections, preferably four, which are arranged in two groups of two sections each, certain of said sections being tapered outwardly and referred to as "key sections," which are first withdrawn toward the center of the tire and then moved outwardly along the axis of the core until out of the original plane thereof, the remaining sections being then moved inwardly so that the tire may be removed.

The object of the invention is to improve upon this existing type of core so as to adapt it for use in the manufacture of tires in which the cross-sectional diameter bears a high ratio with respect to the major diameter. For example, the core shown herein is adapted to the manufacture of 32 x 6 tires, a size which has heretofore been difficult to make in cores of this type as insufficient room is provided for the reception of the collapsing mechanism within the inner core circumference. The invention has for its object the designing of the collapsing mechanism so that it can be operatively contained within the area bounded by the inner core circumference.

With these and other objects in view, the invention will be readily understood from the showing and description given, it being understood that the form and arrangement of parts may be altered or modified within the scope of the invention and the appended claims.

Figure 3:
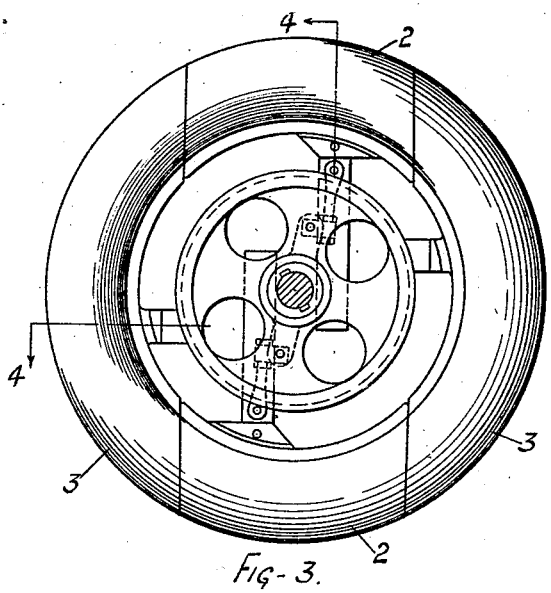
Figure 4:
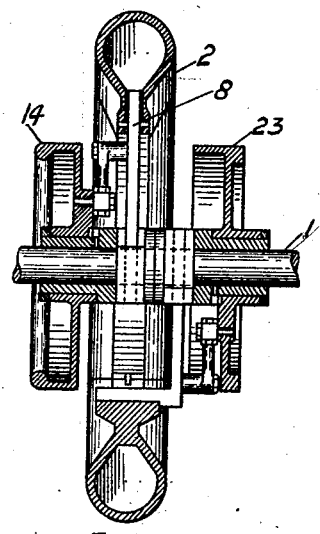
Figure 5:
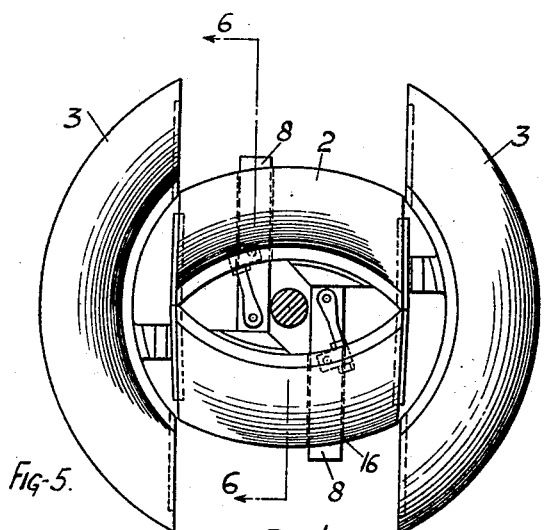
Figure 6:
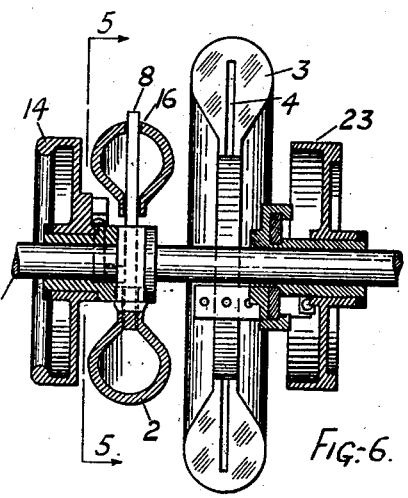
Figure 7:
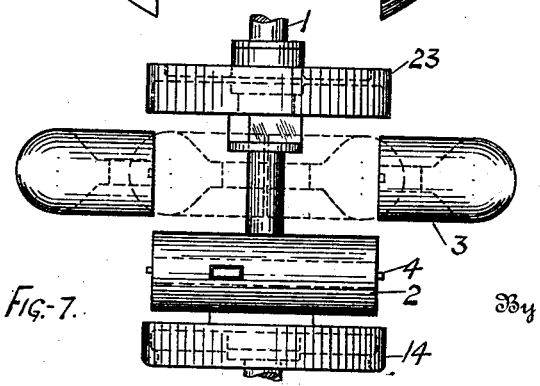

Figures 3 to 7 are somewhat smaller and illustrate the core in its several positions, Figure 3 being a view of the core assembled; Figure 4 a section on the line 4—4 of Figure 3; Figure 5 a view of the core with the key sections withdrawn on the line 5—5 of Figure 6; Figure 6 a section on the line 6—6 of Figure 5; and Figure 7 is a plan view of the core, the final position of the sections intermediate the key sections being shown in dotted lines.

The core is mounted to rotate with a supporting shaft 1 and, as shown, is in four sections, this number being chosen merely for the sake of illustrating the invention. The key sections, which are oppositely positioned, are indicated at 2, 2, and the other or intermediate sections at 3, 3. The key sections are tapered outwardly, as shown, to give the necessary draft which permits the movement of these sections radially between the intermediate sections, the said sections being provided with sliding keyways 4 to obtain the correct register of the sections.

On the shaft 1 is a bracket or plate 5 which is slidably but non-rotatably mounted on the shaft by opposite keys 6 and in the face of the bracket but at opposite sides of the shaft are arranged parallel guide-ways 7. In these guide-ways are slidably received arms 8 which extend to opposite key sections to which they are respectively secured by lugs or bearings 9. At points near the key sections on the arms 8 are pivot pins 10 over which are received links 11, to the other ends of which are secured angularly arranged blocks 12. The bracket is provided with an outwardly extending hub or sleeve 13 on which is rotated a hand wheel 14 to which the blocks 12 are pivoted by pins 15.

Figure 2:
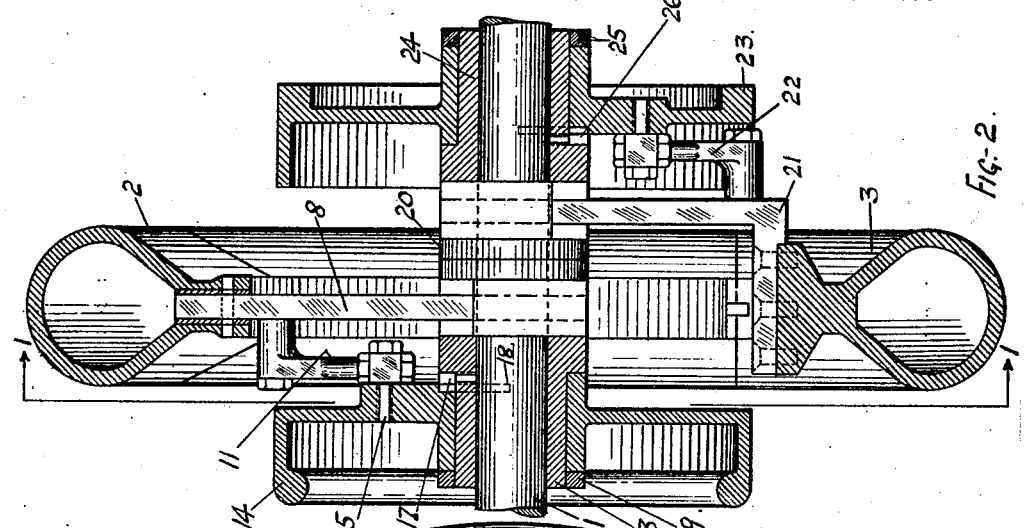
Figure 2 is a section on the angular line 2—2 of Figure 1.
Figure 1:
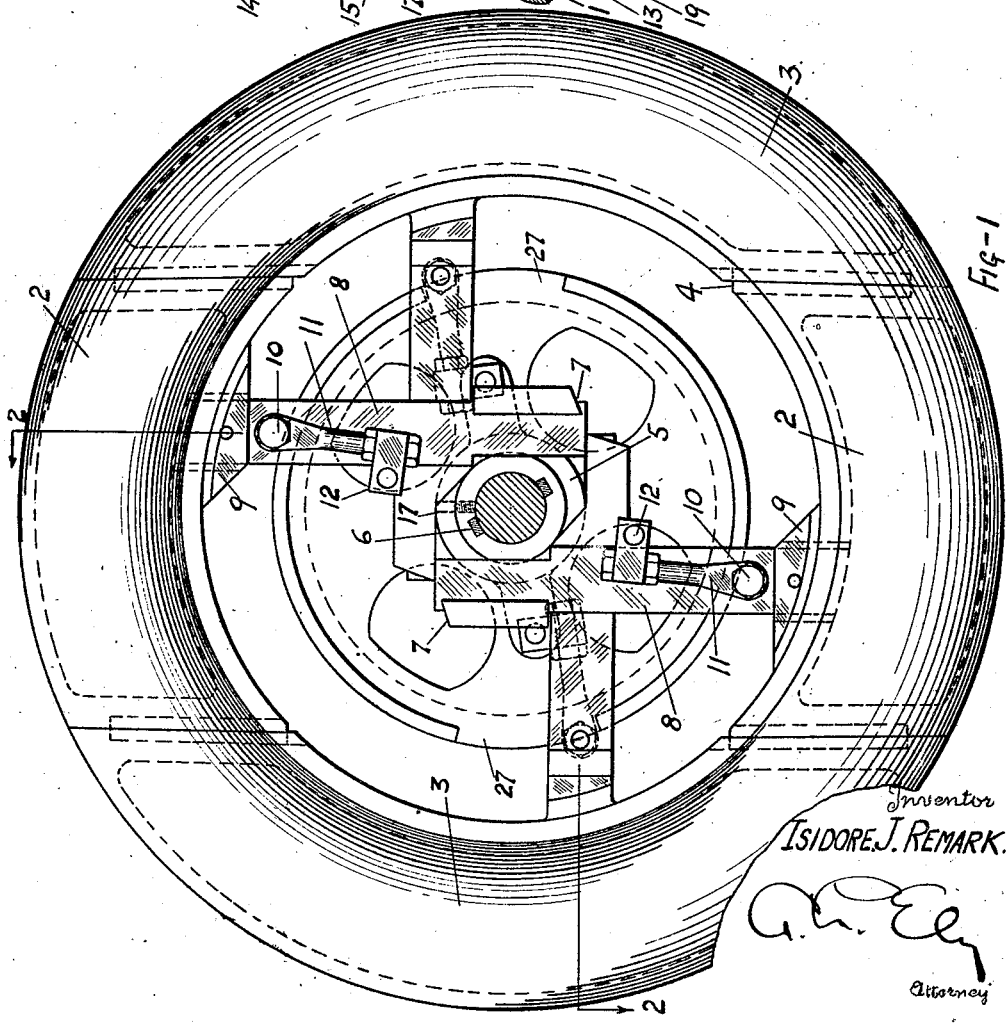
Figure 1 is a side elevation of the core taken on the line 1—1 of Figure 2.

Assuming the core to be in the condition illustrated in Figure 1, the operator rotates the wheel 14 until the sections are drawn inwardly to their position, as shown in Figure 5, each section being provided with an aperture 16 through which the arm 8 on the opposite section may pass. By arranging the arms, as shown, the core sections are capable of a movement further toward the axis of the core than with previous types of cores, thus accomplishing the stated object of the invention.

A stop pin 17 may be secured in the hub 13, the head projecting into an arcuate groove 18 on the inner face of the hand wheel, the ends of the groove limiting the inward and outward movement of the core sections.

When the sections 2, 2 have been brought to their innermost position, the hand wheel 14, which is held on the hub by a collar 19, is drawn outwardly along the shaft, moving the collapsed sections to a position outside of the plane of the core, as shown in Figures 6 and 7.

A slide bracket 20, similar to the bracket 5, is provided for the intermediate sections 3, except that this bracket 20 is secured to the shaft 1. The sections 3 are carried upon angular arms 21 which slide in the bracket 20 and to these arms are pivotally connected links 22, which are also pivoted to the inner hand wheel 23. A hub 24 on the bracket 20 serves as a bearing for the hand wheel, a collar 25 holding the wheel in place and a groove and pin 26 limiting the movement of the hand wheel. By forming the arms 21 angularly, as shown, there is no interference with the arms 8 and the core sections 2, and by placing them on opposite sides of the shaft 1, the sections may be moved inwardly to an extent equal to the movement of the sections 2, 2. Recesses 27 are cut in the rim of the inner hand wheel to allow clearance for the links 22. By the mechanism shown and described, it will be seen that the intermediate sections 3, 3 may be withdrawn from the tire after the sections 2, 2 are moved to their outer collapsed position. In reassembling the core the movements are reversed.

The description has been limited, but it will be understood that changes and modifications may be made, while the essential features of the invention are retained.

What is claimed is:

1. In a collapsible core construction, a shaft, a bracket slidably mounted on the shaft, a second bracket also mounted on the shaft, a plurality of core sections arranged in pairs on opposite sides of the shaft, guide-ways in each bracket, and arms attached to the sections and received within the guideways.

2. In a collapsible core construction, a shaft, a bracket slidably mounted on the shaft, a second bracket also mounted on the shaft, parallel guide-ways in the brackets at opposite sides of the shaft, arms attached to the core sections and received in the guide-ways, and means to move the core sections.

3. In a collapsible core construction, a pair of brackets, one of said brackets being movable toward and from the other, parallel guide-ways in the brackets at opposite sides of the shaft, a plurality of core sections arranged in pairs, arms attached to one pair of sections slidable in one of the brackets, and angular arms attached to the other pair of sections and receivable in the guide-ways in the other bracket.

4. In a collapsible core construction, a plurality of core sections, parallel arms rigidly attached to certain of said sections on opposite sides of the core center and in the plane of the core, and arms rigidly attached to the remaining sections and provided with angular offsets in parallel relation on opposite sides of the core center and outside of the plane of the core.

5. In a collapsible core construction, a plurality of core sections, a slidable bracket at the center of the core, parallel arms rigidly attached to certain of the core sections and guided for radial movement in the bracket, angular arms attached to the other core sections, and a second bracket for guiding the angular arms for movement of the core sections supported thereby toward and from the core center.

6. In a collapsible core construction, a plurality of core sections, a shaft, a bracket slidably mounted on the shaft, a second bracket fastened to the shaft, parallel arms attached to certain of the core sections and slidably received in the first named bracket at opposite sides of the shaft, and arms having parallel offset portions slidably mounted in the second bracket, the arms being attached at their outer ends to the remaining core sections, the offset portions being located on opposite sides of the shaft.

7. In a collapsible core construction, a plurality of core sections, opposite sections being movable in pairs, a shaft, a bracket slidable on the shaft, parallel, unaligned guide-ways in the bracket at opposite sides of the shaft, arms attached to certain core sections and receivable in the guide-ways, links attached to the arms, and an operating wheel on the bracket to which the links are connected.

8. In a collapsible core construction, a plurality of core sections, opposite sections being movable in pairs, a shaft, a bracket on the shaft, guide-ways in the bracket at opposite sides of the shaft, angular arms, said arms being attached at one end to certain core sections and at the other end being receivable in the guide-ways, an operating wheel rotatably mounted on the bracket, and links connecting the wheel and the arms.

ISIDORE J. REMARK.